United States Patent
Parish

(10) Patent No.: US 6,289,996 B1
(45) Date of Patent: Sep. 18, 2001

(54) SECURING DEVICE FOR KNOCK-ON EARTHWORKING TOOL

(76) Inventor: Alan F. Parish, #807-3520 Hillsdale St., Regina, Saskatchewan (CA), S4S 5Z5

(*) Notice: Subject to any disclaimer, the term of this patent is extended or adjusted under 35 U.S.C. 154(b) by 0 days.

(21) Appl. No.: 09/811,436

(22) Filed: Mar. 20, 2001

(51) Int. Cl.$^7$ .................................................. A01B 15/00
(52) U.S. Cl. ......................... 172/730; 172/749; 172/762
(58) Field of Search .................................. 172/762, 752, 172/750, 749, 730, 681, 724, 771, 723, 722, 721, 725, 732, 733, 770, 699; D15/29, 11, 28

(56) References Cited

U.S. PATENT DOCUMENTS

| 5,711,378 | 1/1998 | Yeager | 172/730 |
| 5,979,568 | 11/1999 | Parish | 172/724 |

FOREIGN PATENT DOCUMENTS 2202438  10/1997  (CA) .

OTHER PUBLICATIONS

F.P. Bourgault Tillage Tools Ltd., Advertisement for SPEED–LOC Retainer, 1 page, (2000).

*Primary Examiner*—Christopher J. Novosad

(57) ABSTRACT

A retainer is disclosed for preventing accidental release of a knock-on earthworking tool from an adaptor secured to the tine of an agricultural implement. The retainer, which is integrally formed from a single piece of metal, comprises an anchoring portion which is retained inside a bolt hole of the of the adaptor and a tail portion which extends between the anchoring portion and an aperture in the stem of the earthworking tool. The tail of the retainer has an upturned end which catches in the aperture in the stem of the earthworking tool when the stem is wedged over the adaptor in its normal working position, thereby preventing accidental dislodgement of the earthworking tool during use.

18 Claims, 5 Drawing Sheets

US 6,289,996 B1

SECURING DEVICE FOR KNOCK-ON EARTHWORKING TOOL

FIELD OF THE INVENTION

The invention relates to earthworking tools, such as agricultural sweeps, of the type which are held in wedging frictional engagement on the tines of agricultural tillage implements. More particularly, the invention relates to securing devices for preventing accidental release of such earthworking tools from agricultural tillage implements.

BACKGROUND OF THE INVENTION

Agricultural sweeps are employed as earthworking tools in the cultivation of soil. A typical sweep comprises a stem portion which is removably mounted on the tine of an agricultural tillage implement and an earthworking portion attached to the stem which is pulled through the soil. The earthworking portion typically has an arrowhead shape and comprises a pair of symmetrical wing elements extending rearwardly from a point. An example of an agricultural sweep is described in U.S. Pat. No. 5,979,568, issued Nov. 9, 1999 to Parish.

In the past, agricultural sweeps were typically attached to tillage implements by bolting the stem of the sweep to a tine of the implement, either directly or through an adaptor attached to the tine. Removal of the sweep therefore required the use of wrenches or the like to loosen and/or remove the bolts from the stem of the sweep. As a typical tillage implement would utilize a number of such sweeps, the labor involved in mounting and dismounting such sweeps from the implement was considerable.

To overcome these difficulties, knock-on sweeps were developed in which the adaptor or the tine itself is tapered to be complementary with a tapered stem of the sweep. This type of sweep is mounted by striking the tip of the sweep with a hammer to firmly wedge the stem of the sweep over the adaptor or tine. The sweep can then be dismounted by a hammer blow applied at the rear edge of the stem. An example of a knock-on sweep is described in U.S. Pat. No. 5,711,378, issued Jan. 27, 1998 to Yeager.

Due to their ease of installation and removal, knock-on sweeps have become popular and are now widely used by farmers. However, knock-on sweeps are not free from disadvantages. The primary disadvantage with such sweeps is that the frictional grip between the sweep and the adaptor or tine is subject to failure, resulting in accidental release of the sweep.

To address this problem, many currently available knock-on sweeps, including that disclosed by the above-mentioned Yeager patent, utilize retaining devices to prevent accidental release of the sweep while attempting to preserve the simplified mounting and dismounting feature of knock-on sweeps. The retaining device of Yeager comprises an adaptor onto which the stem of the sweep is wedged in a normal working position. The adaptor has a transverse groove which aligns with rectangular cutouts in the stem of the sweep in the normal working position. A pin is then inserted into the groove and through the cutouts to retain the sweep against accidental release. The pin is also retained against accidental release by a pair of resilient flat springs bolted to the adaptor.

One problem with presently-used retaining devices is that they consist of a number of parts, each of which may be prone to failure under the harsh conditions under which agricultural implements are used. A need therefore exists for a simplified retaining device for securing an earthworking tool to a tillage implement.

SUMMARY OF THE INVENTION

The present invention overcomes the above-mentioned disadvantages of the prior art by providing a simplified device for retaining an earthworking tool on a tine of an agricultural implement, the retaining device according to the invention being comprised of a single piece of metal, and requiring no assembly.

The retaining device according to the invention is particularly suited for use with an adaptor having one or more bolt holes through which the adaptor is bolted to the tine of the implement, and with an agricultural sweep such as that shown in the above-mentioned Parish patent having an aperture in the stem.

The retaining device according to the invention comprises an anchoring portion which is retained inside a bolt hole of the adaptor, and a tail portion which extends between the anchoring portion and the aperture in the stem of the sweep, when the sweep is mounted in its normal working position on the adaptor.

The tail has an upturned end which catches in the aperture in the stem when the stem is wedged over the adaptor to its normal working position, thereby preventing accidental dislodgement of the sweep. The sweep is mounted simply by striking its forward end with a hammer until the upturned end of the tail catches in the aperture in the stem. The sweep is dismounted by first inserting a punch into the aperture and striking the punch with a hammer to dislodge the tail portion from the aperture, and then striking the rear edge of the stem with a hammer to dislodge the sweep.

In one aspect, the present invention provides a retainer for securing an earthworking tool to an elongate tapered adaptor complementary with a stem of the tool, wherein the adaptor has a rear end, a relatively narrower front end, a lower surface and an upper surface having a depression therein, the depression having a peripheral edge; and the stem has a front wall with an aperture therein, the aperture having a peripheral edge; such that when the stem is wedged over the adaptor in a normal working position with an earthworking portion of the tool extending forwardly of the front end of the adaptor and with the upper surface of the adaptor directly opposing the front wall of the stem with a gap therebetween, the depression in the adaptor is linearly spaced from the aperture in the stem in a direction toward the front end of the adaptor; the retainer comprising: (a) an anchoring portion having a front end, a rear end, an upper surface, an opposed lower surface and a side surface connecting the upper and lower surfaces, the anchoring portion being receivable in the depression with the rear end thereof being closely received relative to the peripheral edge of the depression; and (b) a flat tail portion having a front portion connected to the anchoring portion and extending rearwardly therefrom, a rear portion extending rearwardly from the front portion and having a distal end, the tail portion further comprising an upper surface, an opposed lower surface and a side surface connecting the upper and lower surfaces thereof; wherein the front portion of the tail portion is generally flat and planar, has a thickness which is not greater than said gap between the adaptor and the stem, and has a length sufficient to extend rearwardly along a longitudinal axis of the adaptor from the depression in the adaptor to the aperture in the stem when the stem is wedged over the adaptor in the normal working position; the front and rear portions of the tail portion are obtusely angled relative to one another, the angle being such that a maximum height of the distal end of the rear portion, measured relative to the lower surface of the tail portion in the front portion thereof, is greater than said gap between the adaptor and the stem; and the rear end of the tail portion has a length measured rearwardly from the front portion sufficient that the distal end of the rear portion is closely received relative to the peripheral edge of the aperture in the stem when the stem is wedged over the adaptor in said normal working position of the tool.

In another aspect, the present invention provides an assembly for securing an earthworking tool to a tine of an agricultural implement, the earthworking tool having an earthworking portion and a stem with a front wall provided with an aperture, the aperture having a peripheral edge, said assembly comprising: (a) an elongate tapered adaptor having a rear end, a relatively narrower front end, a lower surface and an upper surface having a depression therein, the depression having a peripheral edge, the adaptor being complementary with the stem of the earthworking tool such that, when the stem is wedged over the adaptor in a normal working position with the earthworking portion of the tool extending forwardly of the front end of the adaptor and with the upper surface of the adaptor directly opposing the front wall of the stem with a gap therebetween, the depression in the adaptor is linearly spaced from the aperture in the stem in a direction toward the front end of the adaptor; and (b) a retainer for securing the earthworking tool to the adaptor, said retainer comprising: (i) an anchoring portion having a front end, a rear end, an upper surface, an opposed lower surface and a side surface connecting the upper and lower surfaces thereof, the anchoring portion being receivable in the depression with the rear end thereof being closely received relative to the peripheral edge of the depression; and (ii) a flat tail portion having a front portion connected to the anchoring portion and extending rearwardly therefrom, a rear portion extending rearwardly from the front portion and having a distal end, the tail portion further comprising an upper surface, an opposed lower surface and a side surface connecting the upper and lower surfaces thereof; wherein the front portion of the tail portion is generally flat and planar, has a thickness which is not greater than said gap between the adaptor and the stem, and has a length sufficient to extend rearwardly along the longitudinal axis from the depression in the adaptor to the aperture in the stem when the stem is wedged over the adaptor in the normal working position; the front and rear portions of the tail portion are obtusely angled relative to one another, the angle being such that a maximum height of the distal end of the rear portion, measured relative to the lower surface of the tail portion in the front portion thereof, is greater than said gap between the adaptor and the stem; and the rear end of the tail portion has a length measured rearwardly from the front portion sufficient that the distal end of the rear portion is closely received relative to the peripheral edge of the aperture in the stem when the stem is wedged over the adaptor in said normal working position of the tool.

BRIEF DESCRIPTION OF THE DRAWINGS

The invention will now be described, by way of example only, with reference to the accompanying drawings in which.

DETAILED DESCRIPTION OF PREFERRED EMBODIMENTS

Figure 1:
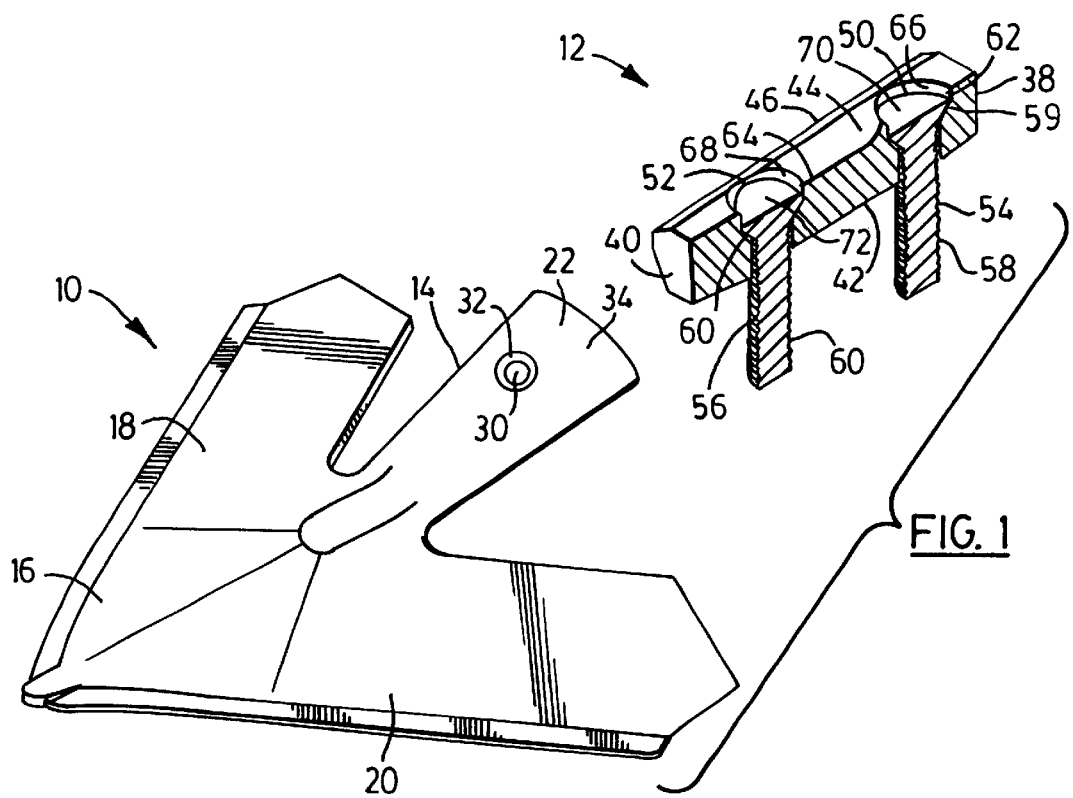
FIG. 1 is a perspective view of an adaptor and an agricultural sweep of the type which can be used in conjunction with the retainer according to the present invention.
Figure 2:
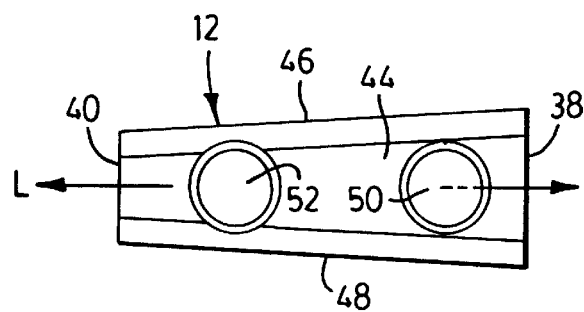
FIG. 2 is a top view of the adaptor shown in FIG. 1.

Turning now to the drawings, in which similar reference numbers denote similar elements throughout the several views, FIGS. 1 and 2 illustrate the type of agricultural sweep and adaptor which are preferably used with the retainer according to the present invention. Reference numeral 10 denotes the sweep and reference numeral 12 denotes the adaptor.

The sweep 10 is preferably of the type having an upwardly-extending tapered stem 14 and an earthworking portion 16 attached to the base of the stem 14. The earthworking portion 16 comprises a pair of wing elements 18 and 20 integrally formed with the stem 14 and with each other.

Figures 14, 15:
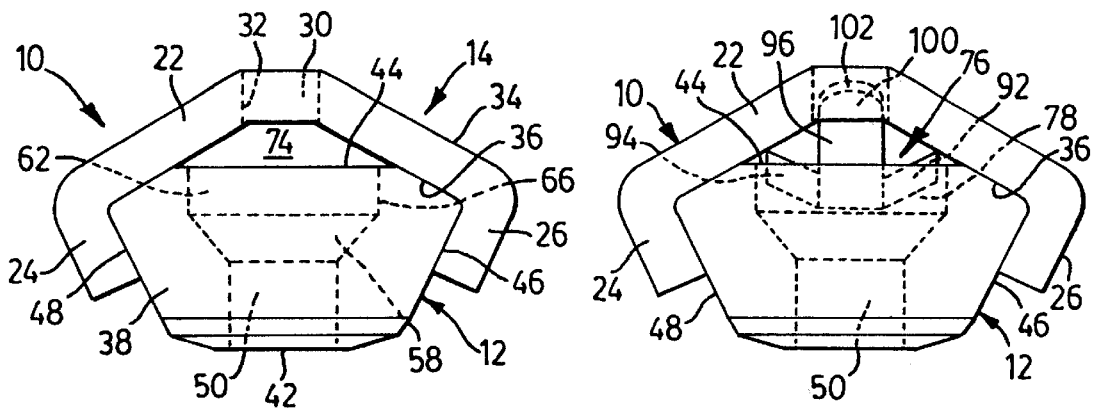
FIG. 14 is an end view of a sweep and adaptor in the normal working position as shown in FIG. 12, with the retainer and the mounting bolts omitted for clarity.
FIG. 15 is an end view as shown in FIG. 14, but also illustrates the retainer of FIG. 3.

Stem 14 has a channel structure with a forwardly-convex front wall 22 and two rearwardly-directed side walls 24 and 26 (FIG. 14). Side walls 24 and 26 converge toward one another in a rearward direction and, together with front wall 22, define a rearwardly-open space 28 (FIG. 10) which is adapted to receive the adaptor 12 in a wedging friction fit.

Provided on the front wall 22 of stem 14 is an aperture 30 which is preferably circular in shape, having a circular peripheral edge 32 which is substantially perpendicular to the front and rear surfaces 34 and 36 (FIG. 10) of the front wall 22.

The sweep illustrated in FIG. 1 is of the type described and claimed in the above-mentioned patent to Parish, the disclosure of which is incorporated herein by reference in its entirety.

As illustrated in FIGS. 1 and 2, the adaptor 12 comprises an elongate, tapered block of metal which is complementary with the stem 14 of sweep 10 and, in particular, is sized and shaped to be closely received inside the rearwardly-open space 28 of the stem 14. Adaptor 12 has a rear end 38, a relatively narrower front end 40, a lower surface 42, an opposed upper surface 44 and a pair of side surfaces 46 and 48 connecting the upper and lower surfaces 44 and 42. A longitudinal axis L of adaptor 12 extends along its length between the front and rear ends 38 and 40.

The side surfaces 46 and 48 of adaptor 12 are multi-faceted, extending outwardly of either side of the planar upper and lower surfaces 44 and 42. During mounting of the sweep 10, the outwardly-extending side surfaces 46 and 48 become wedged against the angled transition between the front wall 22 and the side walls 24, 26 of the stem 14 as shown in FIGS. 14 and 15.

The adaptor 12 is provided with a pair of circular bolt holes 50 and 52 provided with mounting bolts 54 and 56 respectively. Bolts 54 and 56 extend through the adaptor 12 with threaded shanks 58 and 60 thereof projecting from the lower surface 42 of adaptor 12 for threaded engagement with bolt holes on a tine (not shown) of an agricultural implement (not shown). Bolt holes 50 and 52 are also provided with conical portions 59 and 61 respectively for retaining the heads of bolts 54 and 56. These conical portions are flared upwardly toward the upper surface 44 of adaptor 12. Between these conical portions 58, 60 and the upper surface 44 of adaptor are provided countersinks 62, 64 respectively. The countersinks 62, 64 are cylindrical and have respective peripheral edges 66, 68 which are perpendicular to the upper surface 44 of adaptor 12. The peripheral edges 66, 68 of countersinks 62, 64, together with the flat upper surfaces of bolts 54, 56, thus define a pair of shallow depressions 70, 72 in the upper surface 44 of adaptor 12. Depression 70 is proximate the rear end 38 of adaptor 12 and depression 72 is proximate the front end 40.

Figure 12:
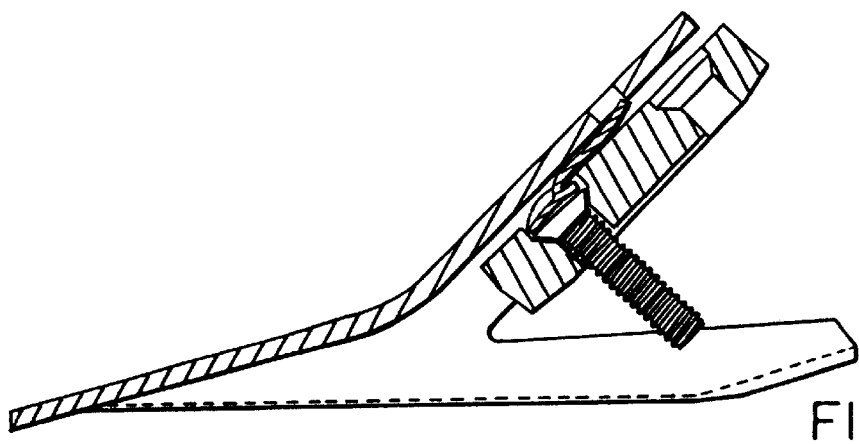
FIG. 12 illustrates the normal working position of the agricultural sweep on the retainer/adaptor combination shown in FIG. 8, with the rear mounting bolt omitted for clarity.

As mentioned above, the sweep 10 is "knocked" onto adaptor 12 by striking the tip of the earthworking portion 16 with a hammer until the stem 14 of sweep 10 is wedged over the adaptor 12 in a normal working position, as illustrated in FIG. 12. In this position, the earthworking portion 16 of sweep 10 extends forwardly of adaptor 12 with the upper surface 44 of adaptor 12 being directly opposed to the front wall 22 of stem 14 and a gap 74 (FIG. 14) existing between the rear surface 36 of front wall 22 and the upper surface 44 of adaptor 12. With the sweep 10 mounted in the normal working position, the front depression 72 in the upper surface 44 is linearly spaced from the aperture 30 in stem 14 in a direction toward the front end 40 of adaptor 12. In other words, the front depression 72 is located forwardly of the aperture 30 in stem 14.

In some preferred embodiments of the present invention, it may also be preferred to provide the adaptor with an upper stop similar to that described in the above-mentioned Yeager patent at the rear end 38 of the adaptor 12, to thereby prevent the stem 14 of sweep 10 from being wedged over adaptor 12 beyond the normal working position, as may happen when the sweep 10 strikes a stone or other hard object.

Figure 3:
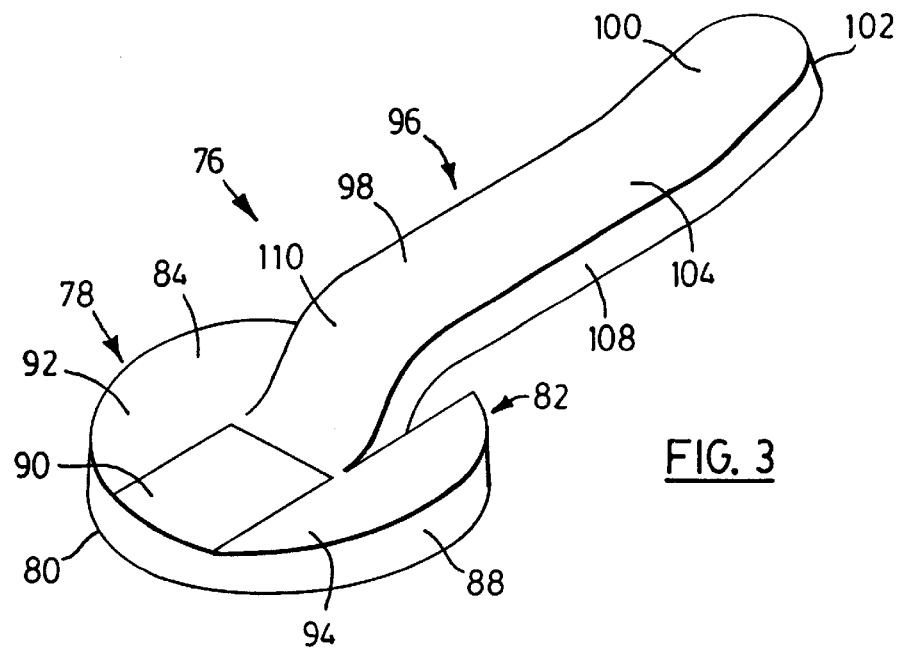
FIG. 3 is a perspective view of a preferred retainer according to the present invention.
Figures 4, 5:
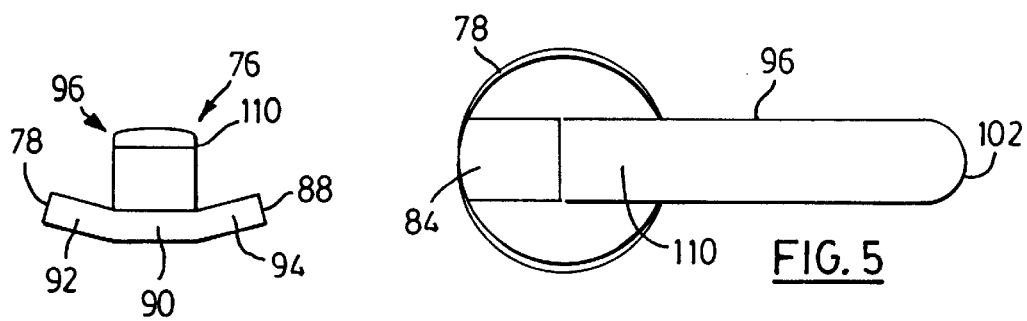
FIG. 4 is a front elevation view of the retainer of FIG. 3.
FIG. 5 is a top elevation view of the retainer of FIG. 3.
Figure 6:
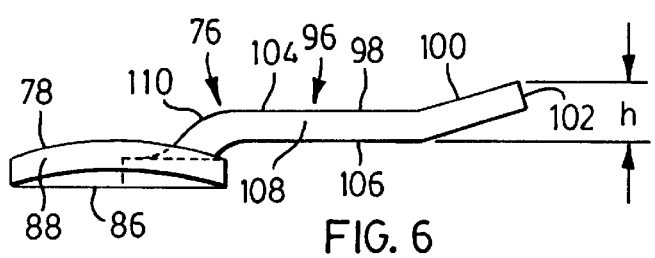
FIG. 6 is a side elevation view of the retainer of FIG. 3.

FIG. 3 is a perspective view of a preferred retainer 76 according to the present invention. Retainer 76 comprises an anchoring portion 78 having a front end 80, an opposed rear end 82, an upper surface 84, an opposed lower surface 86 (FIG. 6) and a side surface 88 connecting the upper and lower surfaces 84 and 86. The anchoring portion 78 is sized and shaped so as to be received in the front depression 72 of adaptor 12 with the rear end 82 of the retainer 76 closely received relative to the peripheral edge 68 of depression 72.

In the preferred embodiment shown in the drawings, the anchoring portion is sized and shaped to fit snugly inside depression 72 and in the preferred embodiment shown in the drawings, the anchoring portion 78 is circular in shape and is of slightly smaller size than the depression 72 in adaptor 12.

Both the upper and lower surfaces 84 and 86 of anchoring portion 78 may preferably be generally flat, planar and substantially perpendicular to the side surface 88, and the side surface 88 may preferably be substantially parallel to the peripheral edge 68 of depression 72. In the preferred embodiment shown in the drawings, the anchoring portion 78 has a central flat portion 90 and a pair of slightly upturned wings 92 and 94 at either side thereof. With the retainer 76 installed in depression 72, the wings 92 and 94 protrude slightly above the upper surface 44 of adaptor 12. As shown in FIG. 15, this permits the wings 92 and 94 to engage the rear surface 36 of stem 14, for reasons which are explained below.

The retainer 76 further comprises a flat tail 96 extending rearwardly from the rear end 82 of anchoring portion 78. The tail 96 comprises a front portion 98 which is connected to the anchoring portion 78 and extends rearwardly therefrom, and a rear portion 100 extending rearwardly from the front portion 98 and having a distal end 102. The tail 96 further comprises an upper surface 104, an opposed lower surface 106 (FIG. 6) and a side surface 108 connecting surfaces 104 and 106.

As best seen in FIG. 12, the front portion 98 of tail 96 is generally flat and planar, and has a thickness which is not greater than the gap 74 between the adaptor 12 and stem 14. This permits the front portion 98 of tail 96 to extend along the upper surface 44 of adaptor 12 from the front depression 70 to the aperture 30 in stem 14.

The rear portion 100 of tail 96 is upturned slightly relative to the front portion 98 so that an obtuse angle is formed between portions 98 and 100. As illustrated in FIG. 12, the rear portion 100 is angled upwardly such that a maximum height h (FIG. 6) of the distal end 102 of rear portion 100, measured relative to the lower surface 106 of tail 96 in the front portion 98 thereof, is greater than the gap 74 between the adaptor 12 and stem 14. Thus, the distal end 102 of rear portion 100 catches in the aperture 30 of stem 14, preventing accidental dislodgement of the sweep 10. Preferably, the distal end 102 of tail 96 is shaped to conform to the shape of aperture 30. Since the aperture 30 is circular, the distal end 102 is preferably rounded.

Furthermore, the rear portion 100 of tail 96 has a length measured rearwardly from the front portion 98 sufficient that the distal end 102 of rear portion 100 is closely received relative to the peripheral edge 32 of aperture 30 when the sweep 10 is received in the normal working position. This prevents substantial forward displacement of the sweep 10 from its normal working position.

For reasons discussed below, a smoothly curved transition portion 110 is preferably provided between the anchoring portion 78 and the tail 96 of the retainer 76.

Figure 7:
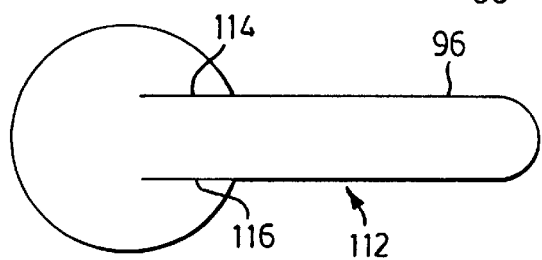
FIG. 7 is a top elevation view of a blank from which the retainer of FIG. 3 is formed.

The anchoring portion 78, tail 96 and transition portion 110 of retainer 76 are preferably integrally formed from a single piece of metal. FIG. 7 illustrates a flat blank 112 of sheet steel from which the retainer 76 is preferably formed. In the embodiment shown in the drawings, the blank 112 is provided with slits 114, 116 extending into the anchoring portion 78 along either side of the tail 96. Therefore, when tail 96 is formed by bending, the transition portion 110 of retainer 76 is located inwardly of the side surface 88 of anchoring portion 78 such that the tail 96 actually protrudes from the upper surface 84 of anchoring portion 78.

The use of retainer 76 in conjunction with adaptor 12 and sweep 10 will now be described with reference to FIGS. 8 to 13. In the following discussion, it will be assumed that the adaptor 12 is bolted to the tine (not shown) of an agricultural implement (not shown).

Figure 8:
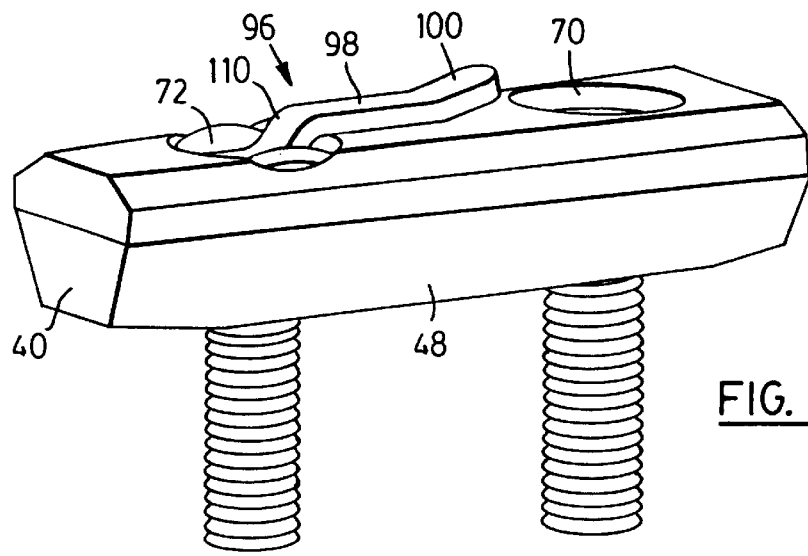
FIG. 8 is a perspective view of the retainer of FIG. 3 in combination with the adaptor of FIG. 1.
Figure 9:
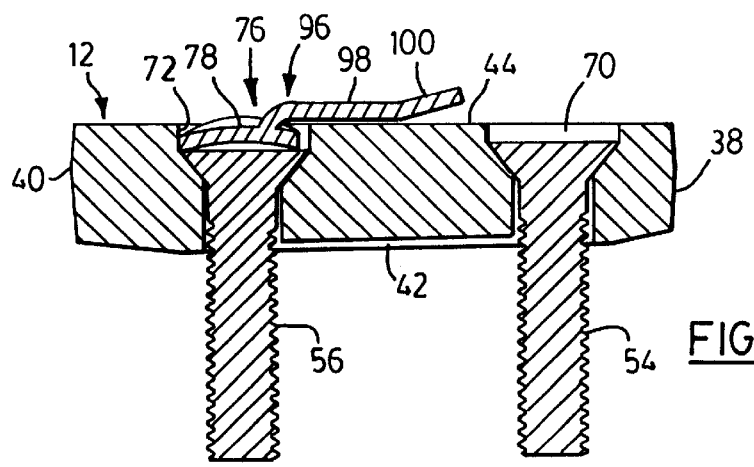
FIG. 9 is a side elevation view of the retainer and adaptor combination shown in FIG. 8.

Prior to mounting the sweep 10, the retainer 76 is mounted on adaptor 12 with the anchoring portion 78 inserted into the front depression 72 and with the tail 96 extending along the longitudinal axis of the adaptor 12 toward the rear depression 70 thereof. This is illustrated in FIGS. 8 and 9.

Figure 10:
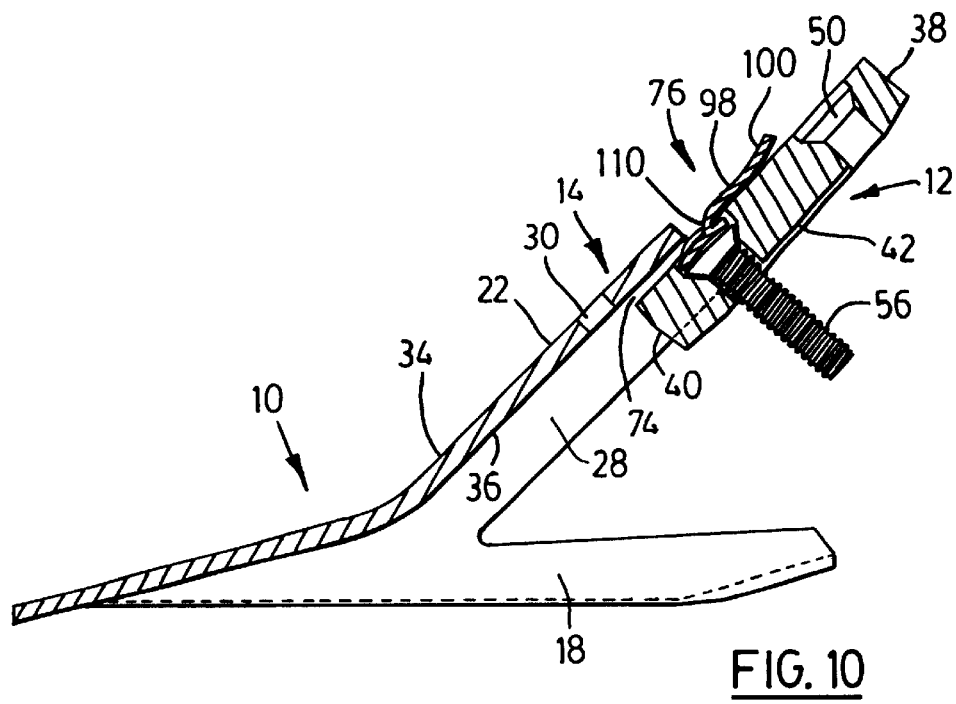
FIG. 10 illustrates a first step in the process of mounting an agricultural sweep on the retainer/adaptor combination shown in FIG. 8, with the rear mounting bolt omitted for clarity.

Next, the stem 14 of sweep 10 is slid over the front end 40 of adaptor 12 as illustrated in FIG. 10. The transition portion 110 of retainer 76 is preferably smoothly curved so as to prevent the upper edge of stem 14 from becoming caught on the forward end of tail 96 as the sweep 10 is slid over adaptor 12.

Figure 11:
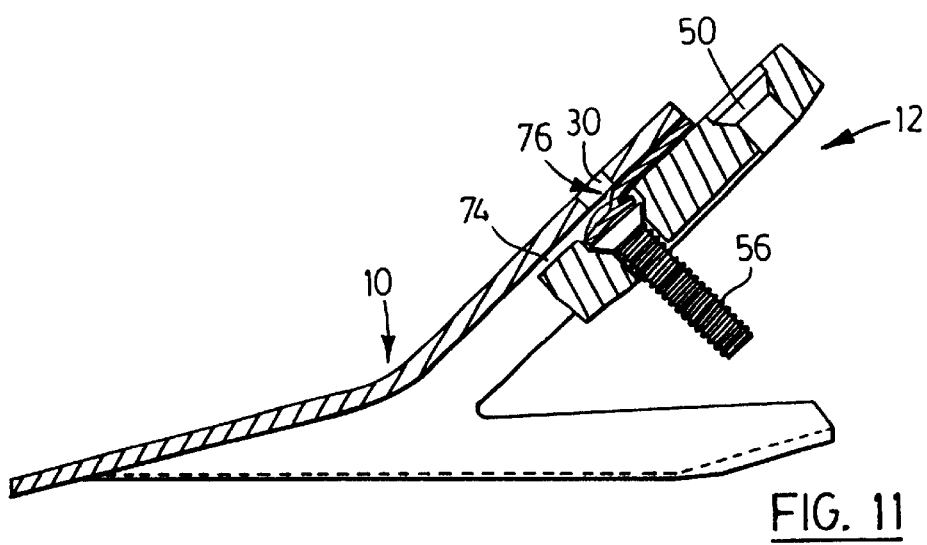
FIG. 11 shows a second step in the mounting of an agricultural sweep on the retainer/adaptor combination shown in FIG. 8, with the rear mounting bolt omitted for clarity.

The sliding of sweep 10 over adaptor 12 is continued, with assistance from one or more hammer blows, if necessary. FIG. 11 shows the front wall 22 of stem 14 having been pushed completely over the tail 96 of retainer 76. Preferably, the retainer 76 is formed of a somewhat flexible material such as spring steel heated-treated to 40–44 RC, such that the upturned rear portion 100 of tail 96 can be bent downwardly to permit the front wall 22 of stem 14 to pass over it during insertion.

When the sweep 10 reaches its normal working position as shown in FIG. 12, the upturned rear portion 100 of tail 96 enters aperture 30 and springs back to its original orientation, at which point the distal end 102 of rear portion 100 catches against the peripheral edge 32 of aperture 30, thus preventing dislodgement of sweep 10. As illustrated in FIG. 15, the tips of upturned wings 92 and 94 of the anchoring portion 78 of retainer 76 engage the rear surface 36 of stem 14. This prevents rocking movement of the retainer 76 along its longitudinal axis, which could otherwise result in dislodgement of the end 100 of tail 96 from aperture 30.

Figure 13:
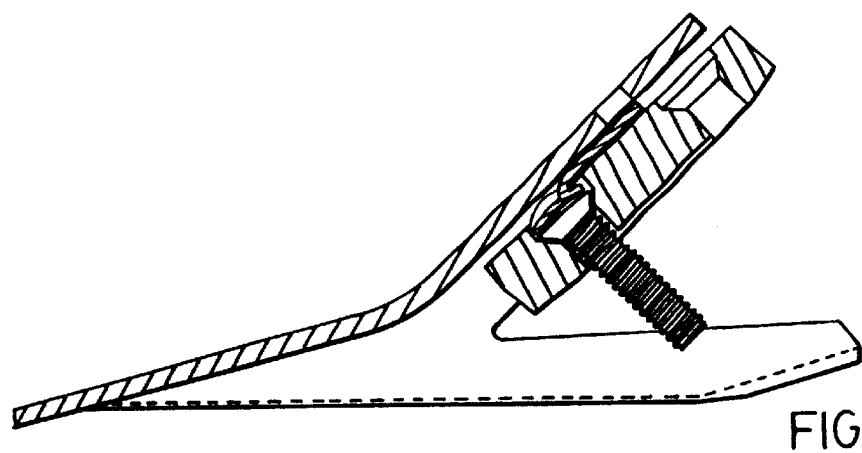
FIG. 13 illustrates the dismounting of the sweep from the retainer/adaptor combination of FIG. 8, with the rear mounting bolt omitted for clarity.

As illustrated inn FIG. 13, the sweep 10 can be easily dislodged by inserting a punch 120 or other narrow tool into aperture 30 and striking the punch 120 with a hammer (not shown) to force the upturned rear portion 100 of tail 96 downwardly and out of engagement with aperture 30. The sweep 10 can then be dislodged from adaptor 12 by striking the upper edge of stem 14 with a hammer.

It will be appreciated that many modifications could be made to the retainer described above without departing from the objects of the present invention. For example, the anchoring portion 78 has been described as having upturned wings 92 and 94 which protrude slightly above the upper surface of adaptor 76. These wings merely serve to increase the overall height of the anchoring portion 78, while permitting the retainer 76 to be formed from a steel blank of constant thickness. The same object could be attained merely by thickening the entire base to protrude above the upper surface 44 of adaptor 12 by an amount which is less than gap 74.

Similarly, the anchoring portion 78 does not necessarily conform to the shape of the depression 72 in the retainer, so long as the anchoring portion 78 prevents substantial longitudinal movement of the retainer 76 relative to the adaptor 12 and sweep 10. Furthermore, the retainer 76 is not necessarily received in a bolt hole of the adaptor 12. Rather, the adaptor 12 could be formed with a depression in its upper surface 44 which functions only to retain the anchoring portion 78 of retainer 76.

Although the invention has been described in connection with certain preferred embodiments, it is not intended to be limited thereto. Rather, the invention includes within its scope all embodiments which may fall within the scope of the following claims.

What is claimed is:

1. A retainer for securing an earthworking tool to an elongate tapered adaptor complementary with a stem of the tool, wherein the adaptor has a rear end, a relatively narrower front end, a lower surface and an upper surface having a depression therein, the depression having a peripheral edge; and the stem has a front wall with an aperture therein, the aperture having a peripheral edge; such that when the stem is wedged over the adaptor in a normal working position with an earthworking portion of the tool extending forwardly of the front end of the adaptor and with the upper surface of the adaptor directly opposing the front wall of the stem with a gap therebetween, the depression in the adaptor is linearly spaced from the aperture in the stem in a direction toward the front end of the adaptor; the retainer comprising:

(a) an anchoring portion having a front end, a rear end, an upper surface, an opposed lower surface and a side surface connecting the upper and lower surfaces, the anchoring portion being sized and shaped so as to be received in the depression with the rear end of the anchoring portion being closely received relative to the peripheral edge of the depression; and (b) a flat tail portion having a front portion connected to the anchoring portion and extending rearwardly therefrom, a rear portion extending rearwardly from the front portion and having a distal end, the tail portion further comprising an upper surface, an opposed lower surface and a side surface connecting the upper and lower surfaces thereof;

wherein the front portion of the tail portion is generally flat and planar, has a thickness which is not greater than said gap between the adaptor and the stem, and has a length sufficient to extend rearwardly along a longitudinal axis of the adaptor from the depression in the adaptor to the aperture in the stem when the stem is wedged over the adaptor in the normal working position;

the front and rear portions of the tail portion are obtusely angled relative to one another, the angle being such that a maximum height of the distal end of the rear portion, measured relative to the lower surface of the tail portion in the front portion thereof, is greater than said gap between the adaptor and the stem; and the rear end of the tail portion has a length measured rearwardly from the front portion sufficient that the distal end of the rear portion is closely received relative to the peripheral edge of the aperture in the stem when the stem is wedged over the adaptor in said normal working position of the tool.

2. The retainer according to claim 1, wherein the side surface of the anchoring portion is substantially perpendicular to the front portion of the tail portion.

3. The retainer according to claim 1, wherein the anchoring portion is substantially planar and is substantially parallel to the front portion of the tail portion.

4. The retainer according to claim 1, wherein the anchoring portion has a thickness such that its upper surface does not substantially protrude above the upper surface of the adaptor when the anchoring portion is inserted in the depression in the adaptor.

5. The retainer according to claim 4, wherein the upper surface of the anchoring portion protrudes from the depression in the adaptor by an amount less than the gap between the adaptor and the stem.

6. The retainer according to claim 1, further comprising a smoothly curved transition portion between the anchoring portion and the tail portion.

7. The retainer according to claim 1, wherein the anchoring portion is sized and shaped to fit snugly inside the depression in the adaptor.

8. The retainer according to claim 7, wherein the anchoring portion is circular with the upper and lower surfaces being substantially flat and planar and perpendicular to the side surface.

9. The retainer according to claim 1, wherein the distal end of the rear portion of the tail portion is shaped to conform to the shape of the aperture in the stem.

10. The retainer according to claim 9, wherein the distal end of the rear portion of the tail portion is rounded.

11. The retainer according to claim 1, wherein the anchoring portion and the tail portion are integrally formed from a steel blank.

12. An assembly for securing an earthworking tool to a tine of an agricultural implement, the earthworking tool having an earthworking portion and a stem with a front wall provided with an aperture, the aperture having a peripheral edge, said assembly comprising:

(a) an elongate taper ed adaptor having a rear end, a relatively narrower front end, a lower surface and an upper surface having a depression therein, the depression having a peripheral edge, the adaptor being complementary with the stem of the earthworking tool such that, when the stem is wedged over the adaptor in a normal working position with the earthworking portion of the tool extending forwardly of the front end of the adaptor and with the upper surface of the adaptor directly opposing the front wall of the stem with a gap therebetween, the depression in the adaptor is linearly spaced from the aperture in the stem in a direction toward the front end of the adaptor; and (b) a retainer for securing the earthworking tool to the adaptor, said retainer comprising:

(i) an anchoring portion having a front end, a rear end, an upper surface, an opposed lower surface and a side surface connecting the upper and lower surfaces thereof, the anchoring portion being receivable in the depression with the rear end thereof being closely received relative to the peripheral edge of the depression; and (ii) a flat tail portion having a front portion connected to the anchoring portion and extending rearwardly therefrom, a rear portion extending rearwardly from the front portion and having a distal end, the tail portion further comprising an upper surface, an opposed lower surface and a side surface connecting the upper and lower surfaces thereof;

wherein the front portion of the tail portion is generally flat and planar, has a thickness which is not greater than said gap between the adaptor and the stem, and has a length sufficient to extend rearwardly along the longitudinal axis from the depression in the adaptor to the aperture in the stem when the stem is wedged over the adaptor in the normal working position;

the front and rear portions of the tail portion are obtusely angled relative to one another, the angle being such that a maximum height of the distal end of the rear portion, measured relative to the lower surface of the tail portion in the front portion thereof, is greater than said gap between the adaptor and the stem; and the rear end of the tail portion has a length measured rearwardly from the front portion sufficient that the distal end of the rear portion is closely received relative to the peripheral edge of the aperture in the stem when the stem is wedged over the adaptor in said normal working position of the tool.

13. The assembly according to claim 12, wherein the side surface of the anchoring portion of the retainer is substantially parallel to the peripheral edge of the depression in the adaptor.

14. The assembly according to claim 12, wherein the tail portion of the retainer is oriented such that, when the anchoring portion of the retainer is received in the depression of the adaptor, the front portion of the tail portion is substantially parallel to the upper surface of the adaptor.

15. The assembly according to claim 12, wherein the anchoring portion of the retainer has a thickness such that its upper surface does not substantially protrude from the depression of the adaptor.

16. The assembly according to claim 15, wherein the upper surface of the anchoring portion protrudes from the depression in the adaptor by an amount less than the gap between the adaptor and the stem.

17. The assembly according to claim 12, wherein both the anchoring portion of the retainer and the depression in the adaptor are circular in shape such that the anchoring portion fits snugly inside the depression in the adaptor.

18. The assembly according to claim 12, wherein the depression in the adaptor comprises a cylindrical countersink of a bolt hole, the bolt hole extending through the lower surface of the adaptor, the thickness of the anchoring portion of the retainer being substantially equal to a depth of said countersink.

* * * * *